United States Patent
Huang et al.

(10) Patent No.: US 7,125,091 B2
(45) Date of Patent: Oct. 24, 2006

(54) METHOD FOR CREATING PRINTING DATA APPLIED TO A PRINTER CAPABLE OF GENERATING INK DROPLETS OF DIFFERENT SIZES

(75) Inventors: Yu-Chu Huang, Taipei (TW); Jessen Chen, Nantou Hsien (TW); Jane Chang, Hsinchu Hsien (TW); Hsiao-Yu Han, Taipei Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 236 days.

(21) Appl. No.: 10/835,714

(22) Filed: Apr. 30, 2004

(65) Prior Publication Data

US 2005/0122361 A1 Jun. 9, 2005

(30) Foreign Application Priority Data

Dec. 5, 2003 (TW) ............................. 92134305 A

(51) Int. Cl.
*B41J 2/205* (2006.01)
(52) U.S. Cl. .................................................. 347/15
(58) Field of Classification Search ................. 347/15
See application file for complete search history.

(56) References Cited

U.S. PATENT DOCUMENTS

| 5,412,410 | A | | 5/1995 | Rezanka |
| 5,497,180 | A | * | 3/1996 | Kawakami et al. ......... 347/131 |
| 5,917,510 | A | | 6/1999 | Narushima et al. |
| 5,975,671 | A | | 11/1999 | Spaulding et al. |
| 6,042,211 | A | * | 3/2000 | Hudson et al. ................ 347/15 |
| 6,065,822 | A | | 5/2000 | Sarraf |
| 6,081,344 | A | * | 6/2000 | Bockman et al. ............ 358/1.9 |
| 6,354,689 | B1 | * | 3/2002 | Couwenhoven et al. ...... 347/19 |
| 6,775,022 | B1 | * | 8/2004 | Noyes et al. ............... 358/1.15 |
| 6,783,203 | B1 | * | 8/2004 | Fujimori ....................... 347/15 |
| 6,830,306 | B1 | * | 12/2004 | Couwenhoven et al. ...... 347/12 |
| 6,834,926 | B1 | * | 12/2004 | Shibata ......................... 347/15 |
| 2002/0080375 | A1 | * | 6/2002 | Waldner et al. .............. 358/1.9 |
| 2002/0176099 | A1 | * | 11/2002 | Gil et al. ...................... 358/1.2 |
| 2002/0186267 | A1 | * | 12/2002 | Velde et al. ................... 347/15 |

* cited by examiner

*Primary Examiner*—Vip Patel
*Assistant Examiner*—Rene Garcia, Jr.
(74) *Attorney, Agent, or Firm*—Townsend and Townsend and Crew LLP

(57) ABSTRACT

A method creates printing data applied to a printer that is capable of generating different sizes of ink drops. Firstly, a halftoning threshold table is created based on all possible combinations that are determined based on the quantity of the printheads and the sizes of ink drops quantity provided by each printhead. When the image data to be printed is received, each pixel of an image will correspond to one combination based on the halftoning threshold table. The corresponding combination is deemed as a halftoning encoded data and represented by several bits. These bits can be separated into plural groups, where the bits contained in each group are for driving a specific printhead. That is to say, each printhead has its own driving data so that the printing process will have superior efficiency.

6 Claims, 4 Drawing Sheets

METHOD FOR CREATING PRINTING DATA APPLIED TO A PRINTER CAPABLE OF GENERATING INK DROPLETS OF DIFFERENT SIZES

BACKGROUND OF THE INVENTION

1. Field of the Invention

The present invention pertains to a method for creating printing data applied to a printer that is capable of generating ink droplets of different sizes, and more particularly to a method in which a halftoning threshold table is created and the result of the halftoning process is encoded in the form of a series of binary bits, wherein these binary bits can directly drive the printer to facilitate the efficiency of the printer.

2. Description of Related Art

So-called "Drop-on-Demand Ink Jet Printing" is achieved by ejecting drops of ink at the desired positions on the proper material to create a printed image when an ink jet cartridge is moving back and forth on the media. In order to create the images having "photographic quality", there should be plenty of density levels for each given pixel. That means the color density levels printed on a single pixel for a color such as cyan, magenta or yellow (C,M,Y) should be programmable. Through the variety combinations of different colors (C,M,Y) in company with the variation of the density levels, lots of colors can be derived to create printed images achieving photographic quality.

The different density levels can be easily accomplished by a multi-drop printing technique. It is understandable that by repeatedly applying multiple drops of ink onto a pixel, color density can be gradually increased whereby any desired density level is able to be created. In order to repeatedly apply multi drops of ink at the same position, the ink jet printhead must move back and forth above the material to be printed. However, such a multi-pass operation for generating high quality images usually requires a lot of time to accumulate enough drops of ink for a single pixel.

In order to acquire photo image quality and to create an appearance of digitized continuous tone images, the quantity of drops of ink deposited on a pixel should be increased. For early printing techniques, the size of each drop is approximately 100 pico-liter. For example, if the printing resolution is 300 dots per inch (dpi), a pixel would almost be completely occupied by only a single drop of ink so that only a few colors can be generated. Hence, the size of each drop must be minimized as far as possible. To overcome the problem, Hewlett-Packard™ developed a photo resolution enhancement technology wherein the present color inkjet printhead (three colors, CMY) has the ability to output a 10 pico-liter drop. Therefore, there are eight drops of ink at most that can be used to construct a single pixel. By applying a different number of drops, for example 0, 1, 3 or 8 drops on a single pixel, four different color density levels from the lightest (white color) to the darkest can be gradually accomplished. If the three primary colors (CMY) are further mixed, more than 250 different colors can be obtained.

For an inkjet printer, image data to be printed is firstly processed by halftoning technique to create the digitized continuous tone images. Since the early printing technique is limited by the large size of the ink drop, the halftoning process only determines that a dot is either deposited or it is not. In this situation, if each pixel is represented by 8-bits digitized data to stand for 0 to 255 continuous density levels, the middle level (i.e. 127) would be adopted as a halftoning threshold value. For any pixel having a density level that exceeds the threshold value, it would be deposited with a drop of ink. Otherwise, for a density level lower than the threshold value, there is no ink deposited on that pixel. Through the halftoning process, the original 8-bits data for representing density level can be simplified to one bit (0/1) that stands for whether the ink should be deposited or not.

As mentioned above, each pixel may be presented by multiple drops of ink to express different density levels and to achieve the photo image quality. Therefore, whether the ink drop is ejected is not the only concern, the information of the depth of color is another point that should be noticed. If the size of ink drops is uniform, the color depth is only determined by the number of the drops applied on the pixel. Obviously, one bit information is unable to represent the multi density levels for a single pixel.

If two bits are adopted to represent four density levels 0 to 3, the digitized continuous tone value 0–255 would be divided into four stages, wherein three threshold values are set at 63, 127 and 191. Therefore, any tone value within any one of the four stages (0–63), (64–127), (128–191) and (192–255) would correspond to a particular density level (0, 1, 2 or 3). The four density levels are sequentially represented in binary form by two bits, i.e. 00, 01, 10 and 11. Such a halftoning process utilizes more than one bit, therefore it is also referred to as "multi-level halftoning process" or "multi-bit halftoning process".

After the halftoning process, each pixel has a corresponding color density level. The next step is to determine how many drops of ink are enough for the density level. The number of the drops can be decided by the following sequences.

Firstly, an allowable maximum quantity of the drops of ink that can be deposited on a single pixel should be determined. If the ink drops applied on paper exceed the allowable number, the variation of the color density is unable to be recognized, or the drops of ink would exceed the area covered by a single pixel. In the above example, the allowable maximum quantity of the drops is 8. Secondly, during the process that the ink is deposited at the same position on paper one drop by one drop until the allowable maximum quantity is reached, the color density can be observed and measured. Since there are four levels for presenting different color densities in this example, 0%, 33%, 66% and 100% color density respectively correspond to zero drops, one drop, three drops and eight drops {0, 1, 3, 8}. As shown in FIG. 4, Y axis stands for the color density and X axis represents the quantity of the drops of ink. According to FIG. 4, any tone value within one of the four stages (0–63), (64–127), (128–191) and (192–255) would respectively correspond to zero drops, one drop, three drops and eight drops {0, 1, 3, 8}.

In the foregoing description, all the drops of ink ejected from the ink jet are identical in size. However, if an inkjet printer has the ability to provide different sizes of ink drops, a printing job would be quickly finished by a proper combination of these ink drops with different sizes, wherein the required total number of the ink drops is the same, but the number of the drops is much less than the previous way.

As disclosed in U.S. Pat. No. 5,917,510, a drop-on-demand ink jet printhead controlled by the piezoelectrical method is able to output ink dots with different sizes according to the result of the halftoning process. The halftoning process adopted in that patent is the so-called "error diffusion". The printhead for the printer is capable of being controlled to eject ink drops of different sizes. Accordingly, the design of such an inkjet printhead is more complex than ordinary types. Moreover, the fabrication cost for the printhead is high. Further, the density level obtained from the halftoning process must be further analyzed to determine how many drops of ink should be ejected from which printhead. Although the printer is able to provide the ink drops of different sizes, the printing speed is still hampered by the corresponding halftoning process, printhead selection and the ink drops determination.

SUMMARY OF THE INVENTION

An objective of the present invention is to provide a method for creating printing data applied to a printer that is capable of generating ink droplets of different sizes. According to the process of the method, continuous tone values of an image are encoded in the form of a series of binary bits, wherein these binary bits can directly drive the printer to facilitate the efficiency.

To accomplish the objective, the method comprises the acts of:

defining "P" as kinds of the ink drops sizes that the printer generates;

defining "N" as an allowable maximum quantity of the ink drops ejected onto a pixel;

creating a halftoning threshold table according to all combinations of P and N, wherein each combination corresponds to one color density level; and performing a halftoning encoding process based on the created halftoning threshold table, wherein each tone value of the image to be printed is classified to one color density level thus to locate a corresponding combination, wherein the combination is represented by a series of binary bits as an encoded result to be applied to drive the printer;

wherein P and N are both positive integers and greater than zero.

Other objects, advantages and novel features of the invention will become more apparent from the following detailed description when taken in conjunction with the accompanying drawings.

DETAILED DESCRIPTION OF THE PREFERRED EMBODIMENT

The present invention pertains to a method for creating data to be printed, and more particularly to a method for a printer that is capable of generating ink drops with different sizes. The printer may utilize only one ink jet printhead to generate ink drops having different sizes, or it may be constructed of plural ink jet printheads each of which can output ink drops with one particular size. The printer that has plural ink jet printheads is utilized hereinafter as an example for purposes of explaining the method of the invention. As discussed in the background of the invention, because an image to be printed is represented by continuous tone values, and the printer must recognize these continuous tone values, the proper data sent to the printheads must be transferred from continuous tone values to a particular format so as to drive the printheads. In this invention, the method mainly includes two stages. The first stage is to create a halftoning threshold table, and the second stage is to encode the continuous tone values based on the halftoning threshold table. The encoded data is supplied to directly drive the plural ink jet printheads.

I. Creation of the Halftoning Threshold Table:

In the following description, it is assumed that a printer is equipped with P ink jet printheads that eject ink drops of different sizes in the same color. Moreover, one row of the image is performed in N passes; that is, the maximum quantity of the drops deposited on a pixel from each ink jet printhead is N. Thus, for each pixel, there are $(N+1)^P$ possible combinations of the drops and sizes. The two parameters P and N are both positive numbers and not equal to zero. For example, if a printer contains two ink jet printheads (P=2) and performs two runs of printing (N=2), there are $(2+1)^2=9$ possible combinations for each pixel, which can be expressed by:

Drop # of P1/P2={0/0, 0/1, 0/2, 1/0, 1/1, 1/2, 2/0, 2/1, 2/2}.

If two printheads respectively output 10 pl. and 30 pl. (pico-liter) for one drop of ink, all the nine combinations are further expressed as the following table.

| Amount of the ink drops (10 pl.) output from the first ink jet (P1) | Amount of the ink drops (30 pl.) output from the second ink jet (P2) | Total capacity of the drops (pl.) | Density (%) | Tone value (0~255) |
|---|---|---|---|---|
| 0 | 0 | 0 | 0 | 0 |
| 0 | 1 | 30 | 37.5 | 96 |
| 0 | 2 | 60 | 75 | 192 |
| 1 | 0 | 10 | 12.5 | 32 |
| 1 | 1 | 40 | 50 | 128 |
| 1 | 2 | 70 | 87.5 | 224 |
| 2 | 0 | 20 | 25 | 64 |
| 2 | 1 | 50 | 62.5 | 160 |
| 2 | 2 | 80 | 100 | 255 |

When these combinations are applied to printing, nine color densities are accordingly presented in two passes. In the above "Density" column, the different densities are expressed in the percentage form, where the combination having the highest quantity of the ink is deemed as 100%.

Figure 1:
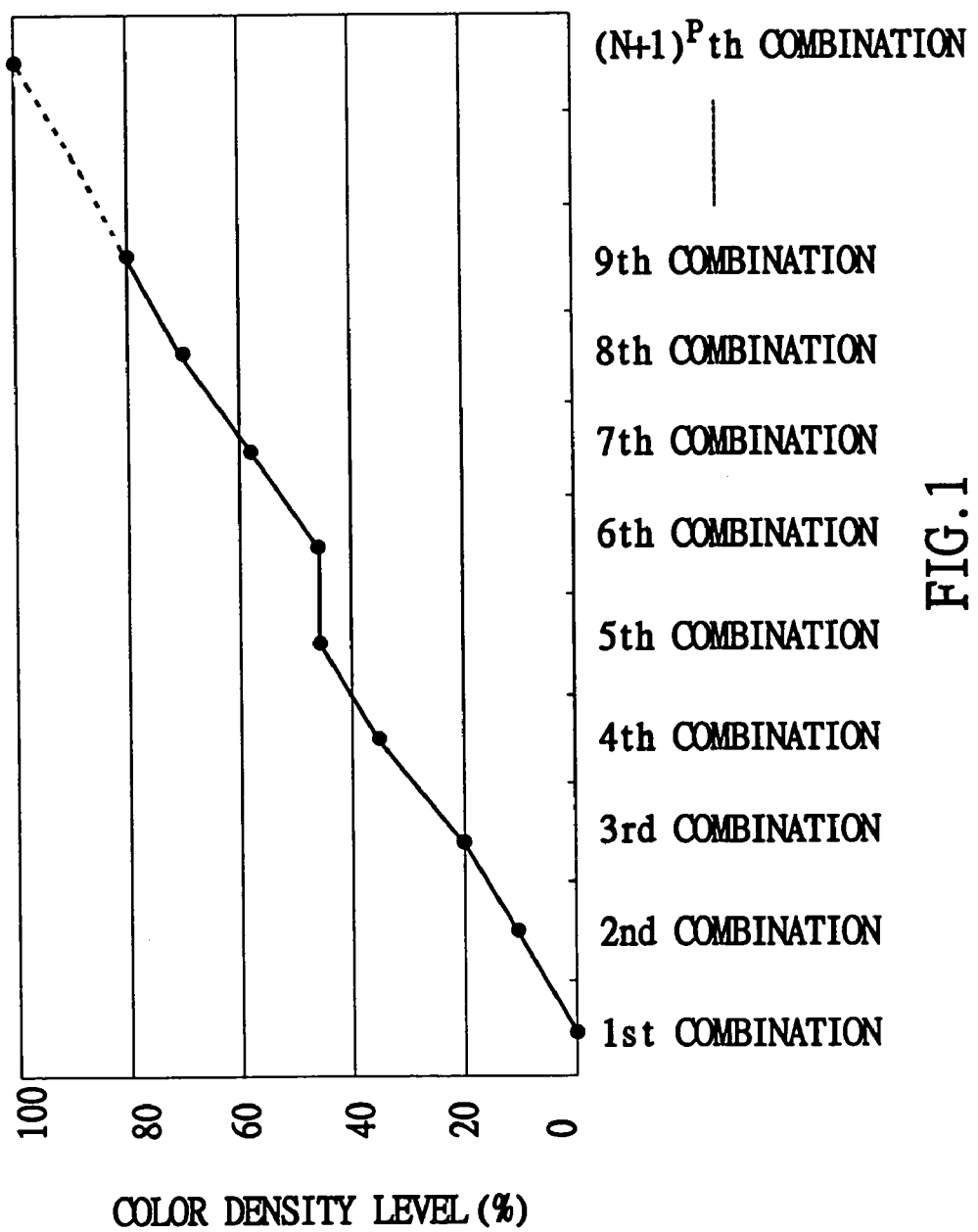
FIG. 1 shows a relationship between the different $(N+1)^P$ combinations of the drops of ink (X axis) and the corresponding color density levels (Y axis) of the present invention.

With reference to FIG. 1, X axis indicates the different $(N+1)^P$ kinds of combinations while Y axis represents the corresponding color density levels. The highest color density level (100%) stands for the darkest color that the printer can generate. If there are no drops being applied (the first combination), it is deemed as the lowest color density level (0%). For any image represented by 8-bits data (continuous tone values 0 to 255), the maximum tone value 255 corresponds to the 100% color density level and the minimum tone value 0 corresponds to the 0%. Based on the particular tone values corresponding to the combinations of ink drops, all tone values 0–255 are divided into several stages proportionally. The threshold values for these stages are accordingly determined and further used to create a halftoning threshold table.

As shown in FIG. 1, it is noted that some combinations may have the same color density, for example the fifth combination and the sixth combination. In this situation, only one combination is necessary to be adopted.

II. Halftone Encoding:

Based on the created halftoning threshold table, the continuous tone values of an image are classified to plural stages, each of which is represented by a halftoning level that is expressed in the form of a series of binary bits. The series of binary bits is deemed as the encoded result.

For the printer constructed of plural ink jet printheads, printing is performed by driving these printheads with different drop sizes in the way of multi-pass and multi-drop. Hence, the result of the halftoning process is output to drive the printheads to eject ink drops from nozzles. In the conventional multi-level halftoning process, the continuous tone values are also divided into plural stages and each stage is expressed by several bits. For example, if there are eight stages for dividing the continuous tone values, these stages are represented by 3-bits digital data, i.e. 000, 001, 010, 011, 100, 101, 110 and 111. However, it should be emphasized that the digital data indeed "sequentially" correspond to the plural stages. That is, the binary data "000" means the first stage (tone values "0–31") and "111" means the eighth stage (tone values 224–255). Consequently, the printer must further determine which printhead should output ink and how many drops are necessary, which results in the difficulty in the improvement of the printing efficiency.

On the contrary, the result of the halftoning process in accordance with the present invention is the ability to directly control the printheads to facilitate the printing speed. It is noted that the encoded results of the binary form do not respectively correspond to the plural stages. In other words, even when there are eight stages, these stages are not sequentially expressed by 000–111.

The encoding result of the present invention contains two kinds of information: the designation of the printhead and the total ink drops ejected from the designated printhead.

For each printhead, a group of binary bits is used to represent the maximum number of ink drops. The maximum number does not exceed the pass number (N) that the ink jet printer operates in.

For example, if N is 3 and a printhead obviously can output 0, 1, 2, or 3 ink drops onto a pixel during three passes, the group of binary bits must at least consist of two bits to represent the four possible types of the drop amount.

When all the groups of the binary bits for all the printheads are combined together as the final result of the halftoning process, the combined result is then output to control all the printheads.

Therefore, for a printer equipped with two printheads (P=2) and operated in three-pass (N=3) mode, there are four bits $a_1a_2a_3a_4$ to represent the result of the halftoning process, wherein the first group of binary bits $a_1a_2$ stands for the number of the drops that the first printhead generates, and the second group $a_3a_4$ is for the second printhead.

Figure 2:
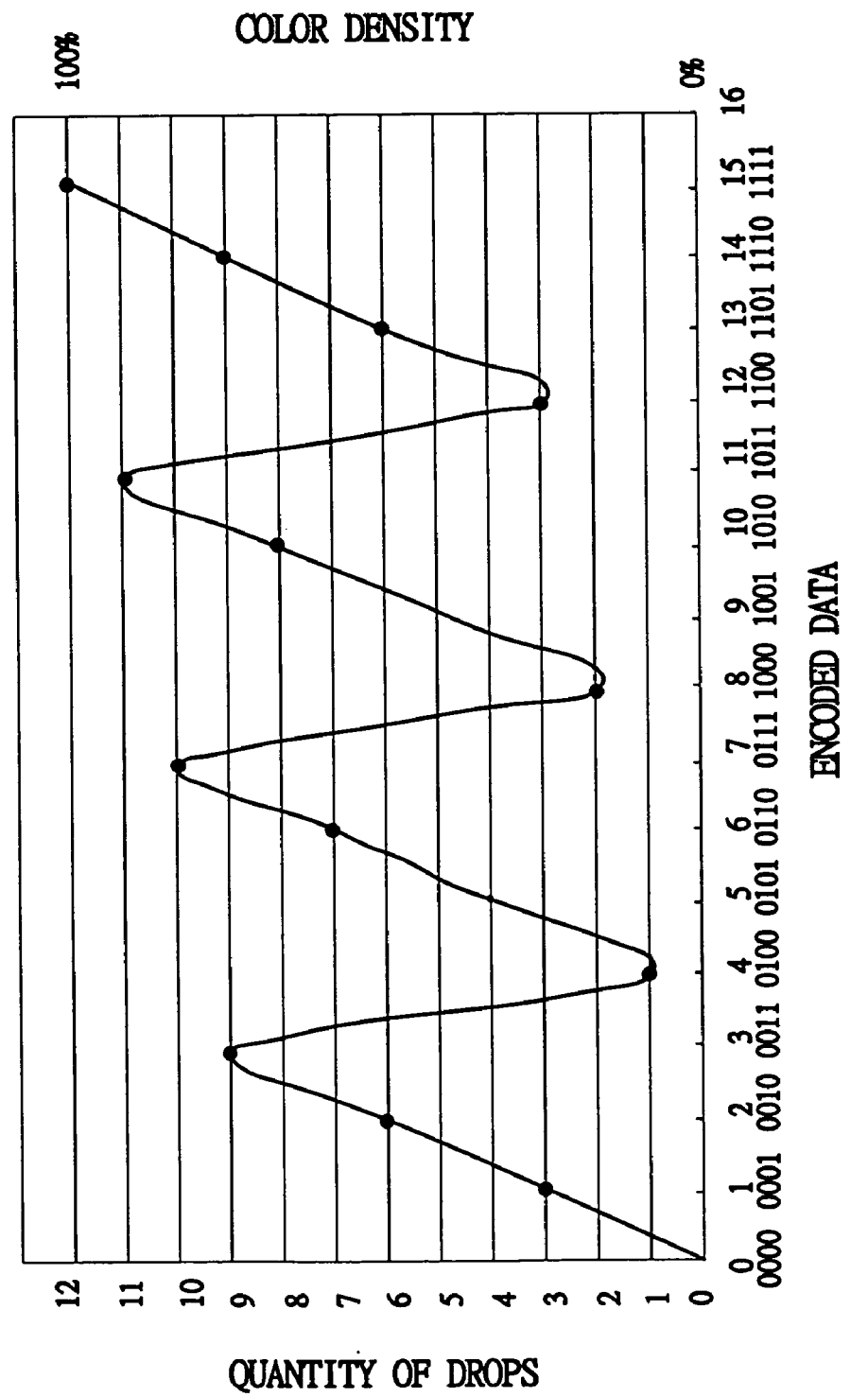
FIG. 2 shows a relationship between the color density levels and the encoded data in accordance with the present invention.

With reference to FIG. 2, for the foregoing printer with two printheads (P=2) and operating in the three-pass (N=3) mode, there are (3+1)2=16 kinds of color density combinations. Since the drop amount for each printhead is represented by two bits, there are total four bits (2 bits+2 bits=4 bits) as the halftoning process result.

In FIG. 2, the 4-bits binary data indicated at the X axis represent the combination of two individual encoded results of the two printheads. For example, binary data 0110 (meaning 6 in decimalism) means that the first printhead should eject one drop (binary data 01) and the second printhead should output two drops (binary data 10).

After all the 16 combinations are printed on the medium to measure the color density, the relationship of the color density levels versus the combinations is shown as the curve. There are a total of 12 density levels equally distributed between 0% to 100%. Each density level corresponds to at least one combination as shown by the enlarged nodes drawn along the curve.

In the halftoning process, continuous tone values (0–255) are equally distributed to the different 12 density levels. After the halftoning process has finished, the density levels are encoded as shown on the X axis in FIG. 2. For example, if a tone value corresponds to the density level 4, the encoded data corresponds to the fifth combination 0101.

Figure 3:
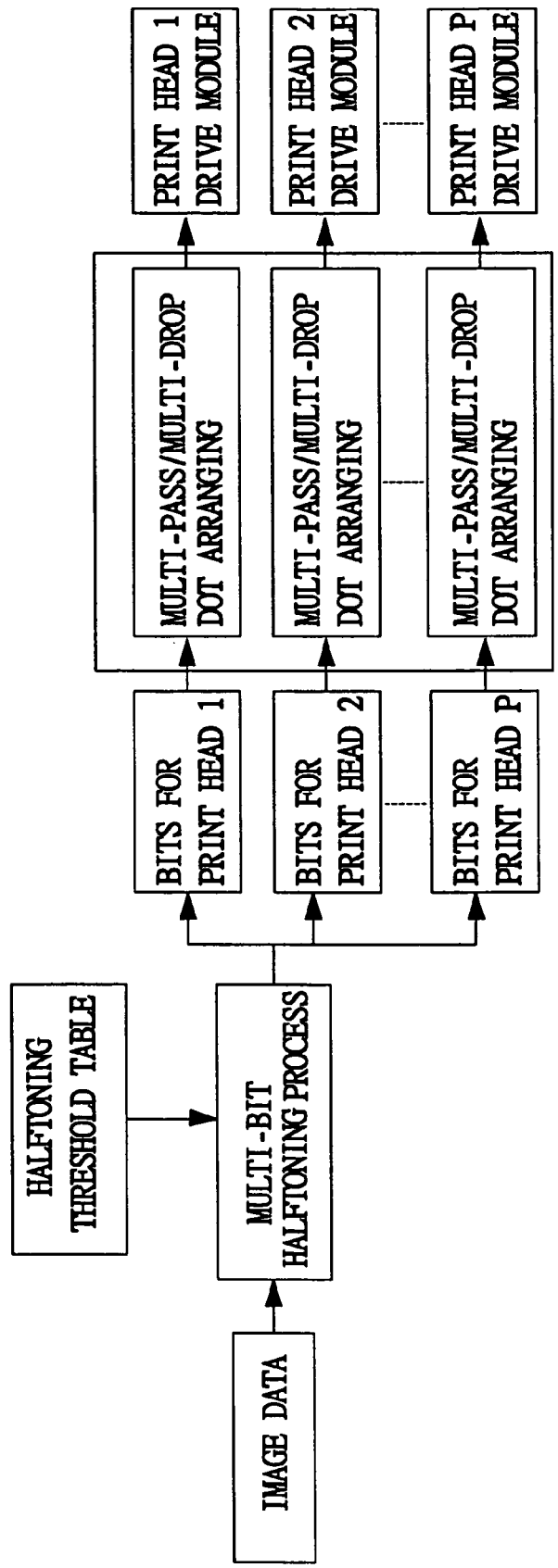
FIG. 3 shows a block diagram showing an image processing flowchart in accordance with the present invention.
Figure 4:
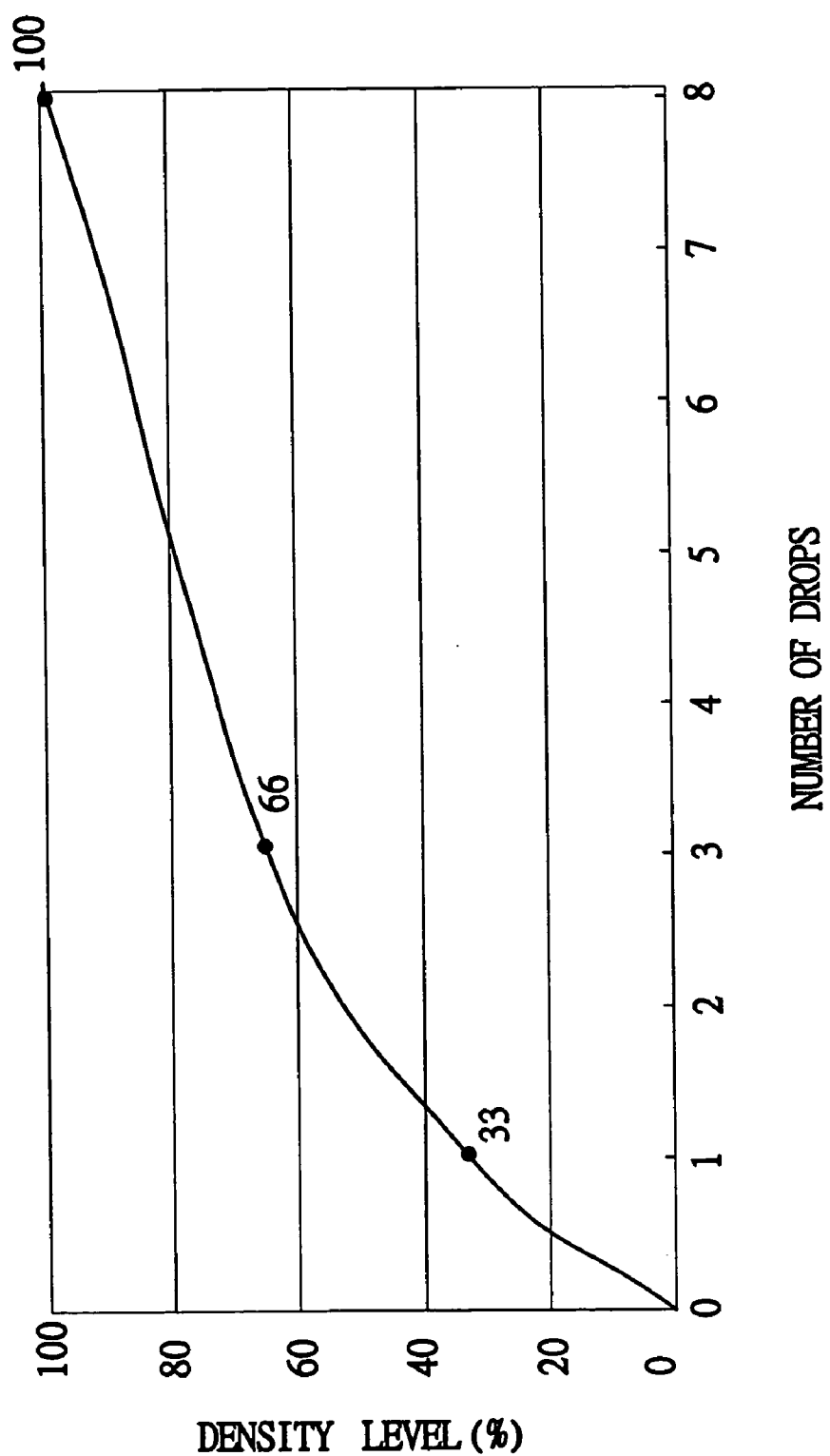
FIG. 4 shows a relationship between the color densities and number of the drops of ink.

With reference to FIG. 3, when an image is processed by the halftoning method based on the halftoning threshold table, the encoded data is separated into several groups that are output to respective printheads so that each printhead can be driven based on the received group of the encoded data.

In conclusion, the method in accordance with the present invention utilizes two main processes to facilitate the printing efficiency. In the first main process, a halftoning threshold table is created according to the relationship of the ejected number of the ink drops versus the density levels. For any image represented by continuous tone values to be printed, the tone values correspond to a density level and are encoded into a series of binary data (multi-bit) in the second main process. The series of binary data are able to be further separated into several groups that are applied to drive the respective printheads. Based on the received binary data, each printhead will eject the desired number of the drops.

It is to be understood, however, that even though numerous characteristics and advantages of the present invention have been set forth in the foregoing description, the disclosure is illustrative only, and changes may be made in detail, within the principles of the invention to the full extent indicated by the broad general meaning of the terms in which the appended claims are expressed.

The invention claimed is:

1. A method for creating printing data of an image to be printed, wherein the created printing data is applied to a printer that is capable of generating ink drops of different sizes, the method comprising the acts of:
    defining "P" as kinds of the ink drops sizes that the printer generates;
    defining "N" as an allowable quantity of ink drops that the printer ejects onto a pixel;
    creating a halftoning threshold table according to all combinations of P and N, wherein there are a total of (N+1)$^P$ kinds of combinations of the N and P, and each combination corresponds to one color density level; and
    performing a halftoning encoding process based on the created halftoning threshold table, wherein each tone value of the image to be printed is classified to one color density level thus to locate a corresponding combination, wherein the combination is represented by a series of binary bits as an encoded result to be applied to drive the printer;
    wherein P and N are both positive integers and greater than zero.

2. The method as claimed in claim 1, wherein the encoded result is the combination of P kinds of ink drop sizes and N kinds of quantity of drops on one pixel.

3. The method as claimed in claim 1, wherein the printer has P printheads to eject P kinds of the sizes of the ink drops.

4. The method as claimed in claim 3, wherein the binary bits representing the encoded result are able to be divided into P groups that respectively correspond to P printheads, wherein each group contains X bits and a relationship between the X and N is satisfied by $2^X=N$.

5. The method as claimed in claim 1, wherein the printer has only one single printhead to eject P kinds of the sizes of the ink drops.

6. The method as claimed in claim 1, wherein the binary bits representing the encoded result are able to be divided into P groups and each group contains X bits, where a relationship between the X and N is satisfied by $2^X=N$.

* * * * *